United States Patent
Effenberger et al.

(10) Patent No.: US 10,623,129 B2
(45) Date of Patent: Apr. 14, 2020

(54) CONTROL AND MANAGEMENT OF A FIRST PON USING A SECOND PON

(71) Applicant: Futurewei Technologies, Inc., Plano, TX (US)

(72) Inventors: Frank Effenberger, Frisco, TX (US); Xiang Liu, Marlboro, NJ (US); Huaiyu Zeng, Red Bank, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 84 days.

(21) Appl. No.: 15/706,460

(22) Filed: Sep. 15, 2017

(65) Prior Publication Data

US 2019/0089478 A1 Mar. 21, 2019

(51) Int. Cl.
*H04B 10/00* (2013.01)
*H04J 14/02* (2006.01)
(Continued)

(52) U.S. Cl.
CPC .... *H04J 14/0267* (2013.01); *H04B 10/25753* (2013.01); *H04Q 11/0062* (2013.01);
(Continued)

(58) Field of Classification Search
CPC ........... H04J 14/0267; H04J 2014/0253; H04J 14/02; H04J 14/0227; H04J 14/0246; H04J 14/025; H04J 14/0265; H04J 14/0273; H04J 14/0282; H04J 14/08; H04B 10/25753; H04B 10/0775; H04B 10/2503; H04B 10/27; H04B 10/272; H04B 10/25754; H04B 1/0003; H04B 7/0452;
(Continued)

(56) References Cited

U.S. PATENT DOCUMENTS 8,855,491 B2 * 10/2014 Elmoalem .......... H04Q 11/0067 398/66
9,420,358 B2 * 8/2016 Trojer ................ H04Q 11/0067
(Continued)

FOREIGN PATENT DOCUMENTS

CN 104737521 A 6/2015
EP 3242418 A1 11/2017
(Continued)

OTHER PUBLICATIONS

"Part 3: Carrier Sense Multiple Access with Collision Detection (CSMA/CD) access method and physical layer specifications," Revisions of IEEE Std 802.3, 2005, 417 pages.
(Continued)

*Primary Examiner* — Hibret A Woldekidan
(74) *Attorney, Agent, or Firm* — Conley Rose, P.C.

(57) ABSTRACT

A system comprising a first optical line terminal (OLT) of a first passive optical network (PON) with the first OLT configured to receive user data from a baseband unit (BBU) and send the user data to a remote radio unit (RRU) via a first optical network unit (ONU) of the first PON using a first wavelength, and a second OLT of a second PON, the second OLT configured to obtain control and management (C&M) information, share the C&M information with the first OLT, and send the C&M information to a second ONU that is co-located with the first ONU using a second wavelength.

33 Claims, 7 Drawing Sheets

(51) Int. Cl.
*H04Q 11/00* (2006.01)
*H04B 10/2575* (2013.01)

(52) U.S. Cl.
CPC .. *H04Q 11/0067* (2013.01); *H04J 2014/0253* (2013.01); *H04Q 2011/0088* (2013.01)

(58) Field of Classification Search
CPC .......... H04B 10/25759; H04B 10/2504; H04B 10/25755; H04B 10/25756; H04Q 11/0062; H04Q 11/0067; H04W 52/0206
USPC ............ 398/66, 67, 70, 71, 72, 115, 116, 45
See application file for complete search history.

(56) References Cited

U.S. PATENT DOCUMENTS

| | | | | |
|---|---|---|---|---|
| 10,009,673 | B1* | 6/2018 | Liu | H04Q 11/0067 |
| 10,142,094 | B2* | 11/2018 | Liu | H04J 14/0227 |
| 10,355,801 | B2* | 7/2019 | Zhou | H04J 14/08 |
| 2008/0144622 | A1* | 6/2008 | Platnic | H04L 63/062 370/390 |
| 2009/0060507 | A1 | 3/2009 | Effenberger et al. | |
| 2011/0033189 | A1* | 2/2011 | Biegert | H04B 10/25754 398/115 |
| 2011/0135306 | A1 | 6/2011 | Kim et al. | |
| 2012/0301147 | A1* | 11/2012 | Zhao | H04J 3/0664 398/66 |
| 2013/0202286 | A1 | 8/2013 | Boyd et al. | |
| 2013/0272707 | A1* | 10/2013 | Cavaliere | H04J 14/0226 398/68 |
| 2013/0308937 | A1* | 11/2013 | Pohlmann | H01S 5/0014 398/27 |
| 2014/0099101 | A1* | 4/2014 | Elhage | H04L 41/145 398/25 |
| 2014/0301734 | A1 | 10/2014 | Fang | |
| 2015/0207585 | A1* | 7/2015 | Luo | H04J 14/0256 398/72 |
| 2015/0288444 | A1* | 10/2015 | Pu | H04L 41/0663 398/5 |
| 2015/0288452 | A1 | 10/2015 | Stupar et al. | |
| 2016/0134953 | A1* | 5/2016 | Kramer | H04Q 11/0067 398/45 |
| 2018/0234188 | A1* | 8/2018 | Hisano | H04B 10/2575 |

FOREIGN PATENT DOCUMENTS

| | | | | |
|---|---|---|---|---|
| WO | 2016106584 | A1 | 7/2016 | |
| WO | WO-2016204226 | A1 * | 12/2016 | H04B 10/2575 |

OTHER PUBLICATIONS

"Draft Standard for a Precision Clock Synchronization Protocol for Networked Measurement and Control Systems," IEEE P1588 D2.2, 2007, 305 pages.
"IEEE Standard for Precision Clock Synchronization Protocol for Networked Measurement and Control Systems," IEEE Instrumentation and Measurement Society, IEEE Std 1588, Jul. 24, 2008, 289 pages.
"Series G: Transmission Systems and Media, Digital Systems and Networks, Digital sections and digital line system—Optical line systems for local and access networks, Gigabit-capable passive optical networks (GPON): General characteristics," ITU-T, G.984.1, Mar. 2008, 43 pages.
"Series G: Transmission Systems and Media, Digital Systems and Networks, Digital sections and digital line system—Optical line systems for local access networks, Gigabit-capable Passive Optical Networks (GPON): Physical Media Dependent (PMD) layer specification," ITU-T, G.984.2, Mar. 2003, 38 pages.
"Series G: Transmission Systems and Media, Digital Systems and Networks, Digital sections and digital line system—Optical line systems for local access networks, Gigabit-capable Passive Optical Networks (GPON): Physical Media Dependent (PMD) layer specification, Amendment 1: New Appendix III—Industry best practice for 2.488 Gbit/s downstream, 1.244 Gbit/s upstream G-PON," ITU-T, G.984.2, Feb. 2006, 12 pages.
"Series G: Transmission Systems and Media, Digital Systems and Networks, Digital sections and digital line system—Optical line systems for local access networks, Gigabit-capable Passive Optical Networks (GPON): Physical Media Dependent (PMD) layer specification, Amendment 2," ITU-T, G.984.2 Amendment 2, Mar. 2008, 16 pages.
"Series G: Transmission Systems and Media, Digital Systems and Networks, Digital sections and digital line system—Optical line systems for local access networks, Gigabit-capable Passive Optical Networks (GPON): Physical Media Dependent (PMD) layer specification," ITU-T, G.984.3, Mar. 2008, 146 pages.
"Series G: Transmission Systems and Media, Digital Systems and Networks, Digital sections and digital line system—Optical line systems for local access networks, Gigabit-capable Passive Optical Networks (GPON): Physical Media Dependent (PMD) layer specification, Amendment 1—Specification of the ONU registration method and various clarifications," ITU-T, G.984.3, Amendment 1, Feb. 2009, 16 pages.
"Series G: Transmission Systems and Media, Digital Systems and Networks, Digital sections and digital line system—Optical line systems for local access networks, Gigabit-capable Passive Optical Networks (GPON): Physical Media Dependent (PMD) layer specification, Amendment 2: Time-of-day distribution and maintenance updates and clarifications," ITU-T, G.984.3, Amendment 2, Nov. 2009, 18 pages.
"Series G: Transmission Systems and Media, Digital Systems and Networks, Digital sections and digital line system—Optical line systems for local access networks, Gigabit-capable Passive Optical Networks (GPON): Physical Media Dependent (PMD) layer specification, Amendment 3," ITU-T, G.984.3, Amendment 3, Apr. 2012, 18 pages.
"Erratum 1 (Apr. 2010 to Reccomendation ITU-T G.984.3 (2008))," Covering Note, Apr. 28, 2010, 1 page.
"Series G: Transmission Systems and Media, Digital Systems and Networks, Digital sections and digital line system—Optical line systems for local access networks, Gigabit-capable Passive Optical Networks (GPON): ONT management and control interface specification," ITU-T, G.984.4, Feb. 2008, 430 pages.
"Series G: Transmission Systems and Media, Digital Systems and Networks, Digital sections and digital line system—Optical line systems for local access networks, Gigabit-capable Passive Optical Networks (GPON): ONT management and control interface specification, Amendment 1," ITU-T, G.984.4, Amendment 1, Jun. 2009, 92 pages.
"Series G: Transmission Systems and Media, Digital Systems and Networks, Digital sections and digital line system—Optical line systems for local access networks, Gigabit-capable Passive Optical Networks (GPON): ONT management and control interface specification, Amendment 2: Changes and extensions to the OMCI, editorial clarifications and corrections," ITU-T, G.984.4, Amendment 2, Nov. 2009, 164 pages.
"Series G: Transmission Systems and Media, Digital Systems and Networks, Digital sections and digital line system—Optical line systems for local access networks, Gigabit-capable Passive Optical Networks (GPON): ONT management and control interface specification, Amendment 3: Clarification of scope of application," ITU-T, G.984.4, Amendment 3, Jul. 2010, 10 pages.
"Series G: Transmission Systems and Media, Digital Systems and Networks, Digital sections and digital line system—Optical line systems for local access networks, Gigabit-capable Passive Optical Networks (GPON): ONT management and control interface specification, Corrigendum 1," ITU-T, G.984.4, Corrigendum 1, Mar. 2010, 8 pages.
"Erratum 1 (Aug. 2009) to Recommendation ITU-T G.984.4 (Feb. 2008), Gigabit-capable passive optical networks (G-PON): ONT management and control interface specification," Covering Note, Aug. 12, 2009, 2 pages.

(56) References Cited

OTHER PUBLICATIONS

Liu, X., et al., "Emerging Optical Access Network Technologies for 5G Wireless [Invited]," J. Opt. Commun. Netw., vol. 8, No. 12, Dec. 2016, pp. B70-B79.
Tashiro, T., et al., "A Novel DBA Scheme for TDM-PON based Mobile Fronthaul," OFC, 2014, 3 pages.
Foreign Communication From a Counterpart Application, PCT Application No. PCT/CN2017/102960, English Translation of International Search Report dated Jun. 13, 2018, 5 pages.
Foreign Communication From a Counterpart Application, PCT Application No. PCT/CN2017/102960, English Translation of Written Opinion dated Jun. 13, 2018, 4 pages.

* cited by examiner

CONTROL AND MANAGEMENT OF A FIRST PON USING A SECOND PON

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A radio access network (RAN) is a network that provides connectivity between mobile devices and a wired network (e.g. the Internet). A cloud/centralized RAN (C-RAN) is a centralized, cloud computing-based architecture for radio access networks that supports second generation (2G), third generation (3G), fourth generation (4G), fifth generation (5G), and future wireless communication standards. As the demand for wireless connectivity has increased, mobile operators have looked for ways to minimize the footprint and cost of their equipment, as well as increase the data transfer rate and bandwidth of the C-RAN. This has led to moving some of the C-RAN equipment from the cellular antenna sites to a central office. In particular, the baseband unit (BBU) has been moved to a central office from which multiple remote radio units (RRUs) can be served, where the RRUs remain at the cellular antenna sites (e.g. the cellular towers). In this configuration, the portion of the network from the BBU to the RRUs is generally referred to as the mobile fronthaul.

SUMMARY

According to a first aspect of the present disclosure, there is provided a system comprising a first optical line terminal (OLT) of a first passive optical network (PON), the first OLT configured to receive user data from a BBU and send the user data to a RRU via a first optical network unit (ONU) of the first PON using a first wavelength, and a second OLT of a second PON, the second OLT configured to obtain control and management (C&M) information, share the C&M information with the first OLT, and send the C&M information to a second ONU that is co-located with the first ONU using a second wavelength. In the above embodiment or in a separate embodiment, the second OLT is configured to send the C&M information to the second ONU independently of the first OLT sending the user data to the first ONU. In any of the above embodiments or in a separate embodiment, the second OLT is configured to perform MAC processing before sending the C&M information to the second ONU. In any of the above embodiments or in a separate embodiment, the second ONU is configured to share the C&M information with the co-located first ONU. In any of the above embodiments or in a separate embodiment, the C&M information comprises at least one of ranging information, time of day (ToD) information, registration information, or dynamic bandwidth allocation (DBA) information. In any of the above embodiments or in a separate embodiment, the system further comprises an OLT memory coupled to the first OLT and the second OLT, wherein the C&M information is stored in the OLT memory, and wherein the first OLT and the second OLT both use the C&M information. In any of the above embodiments or in a separate embodiment, the first OLT and the second OLT use a same time quanta (TQ). In any of the above embodiments or in a separate embodiment, the first OLT comprises a first clock having a first TQ, wherein the second OLT comprises a second clock having a second TQ, and wherein the second TQ is a positive integer multiple of the first TQ. In any of the above embodiments or in a separate embodiment, the second OLT is configured to generate a moving average ToD from received ToD measurements, wherein the first OLT is configured to use the moving average ToD to adjust a clock of the first OLT. In any of the above embodiments or in a separate embodiment, the C&M information is sent by the second OLT at a second data transfer rate, wherein the user data is sent at a first data transfer rate that is faster than the second data transfer rate. In any of the above embodiments or in a separate embodiment, the first PON is part of an efficient/Ethernet/evolved common public radio interface (eCPRI), the second PON is a gigabit PON (GPON) or an Ethernet PON (EPON), and the eCPRI is a functional split between the BBU and the RRU.

According to a second aspect of the present disclosure, there is provided a system comprising an OLT memory, a first OLT of a first PON coupled to the OLT memory and configured to transmit downstream user data to a first ONU of the first PON at a first data transfer rate using a first wavelength, and a second OLT of a second PON coupled to the OLT memory and configured to transmit downstream information to a second ONU that is collocated with the first ONU, wherein the downstream information is sent at a second data transfer rate that is lower than the first data transfer rate, and wherein the downstream information is sent using a second wavelength. In the above embodiment or in a separate embodiment, the downstream information sent at the second data transfer rate comprises C&M information. In the above embodiment or in a separate embodiment, the first OLT is configured to couple to a BBU. In any of the above embodiments or in a separate embodiment, the system further comprises a third OLT coupled to the OLT memory and configured to communicate with the BBU and transmit a second downstream user data to a third ONU at the first data transfer rate using a third wavelength, wherein the third OLT is further configured to obtain C&M information from to the second OLT. In any of the above embodiments or in a separate embodiment, the second OLT is further configured to read multiple ToD measurements per day from the OLT memory, perform a moving average of the ToD measurements to generate a moving average ToD, and provide the moving average ToD to the first OLT, wherein the first OLT is further configured to use the moving average ToD to adjust a first OLT clock. In any of the above embodiments or in a separate embodiment, the second OLT sends the C&M information to the second ONU independently of the first OLT sending the user data to the first ONU. In any of the above embodiments or in a separate embodiment, the second OLT performs MAC processing before sending the C&M information to the second ONU. In any of the above embodiments or in a separate embodiment, one or more of the first ONU, the second OLT, the second ONU, the BBU, or the RRU are clock synchronized with the first OLT as a result of sharing the C&M information. In any of the above embodiments or in a separate embodiment, the second ONU shares the C&M information with the co-located first ONU. In any of the above embodiments or in a separate embodiment, the system further comprises an OLT memory coupled to the first OLT and the second OLT, wherein the C&M information is stored in the OLT memory, and wherein the first OLT and the second OLT both use the C&M information. In any of the above embodiments or in a separate embodiment, the first OLT and the second OLT use a same TQ. In any of the above embodiments or in a separate embodiment, the first OLT comprises a first clock having a first TQ, wherein the second OLT comprises a second clock having a second TQ, and wherein the second TQ is a positive integer multiple of the first TQ. In any of the above embodiments or in a separate embodiment, the system further comprises the second PON generating a moving average ToD from received ToD measurements, wherein the first OLT uses the moving average ToD to adjust a clock of the first OLT. In any of the above embodiments or in a separate embodiment, the first PON is part of an eCPRI, wherein the second PON is a GPON or an EPON, and wherein the eCPRI is a functional split between the BBU and the RRU.

According to a third aspect of the present disclosure, there is provided a system comprising an ONU memory, a first ONU of a first PON configured to send upstream user data to a first OLT of the first PON at a first data transfer rate using a first wavelength, and a second ONU of a second PON coupled to the ONU memory and configured to send C&M information to a second OLT of the second PON, the C&M information being for the first ONU and the second ONU, wherein the C&M information is sent at a second data transfer rate using a second wavelength, and wherein the user data is sent at a first data transfer rate that is faster than the second data transfer rate. In any of the above embodiments or in a separate embodiment, the first ONU comprises a first ONU receiver comprising an analog to digital converter (ADC) and a first digital signal processor. In any of the above embodiments or in a separate embodiment, the first ONU comprises a first ONU transmitter, the second ONU comprises a second ONU transmitter, and the system further comprises a wavelength multiplexer coupled to the first ONU transmitter and the second ONU transmitter. In any of the above embodiments or in a separate embodiment, the first ONU comprises a first ONU receiver, the second ONU comprises a second ONU receiver, and the system further comprises a wavelength de-multiplexer coupled to the first ONU receiver and the second ONU receiver. In any of the above embodiments or in a separate embodiment, the upstream user data is transmitted in bursts that are cycled at a time interval that is less than or equal to 100 microseconds.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Common public radio interface (CPRI) is an interface used for radio base stations between the radio equipment controller (REC) (e.g. the BBU) and the radio equipment (RE) (e.g. the RRU) and is used in many mobile fronthaul configurations. But CPRI is not very bandwidth-efficient. To increase the efficiency of CPRI, eCPRI is being defined. One implementation of eCPRI uses a PON in the mobile fronthaul architecture (e.g. the PON operates between the BBU and the RRUs and implements eCPRI). When eCPRI is used with a traditional PON for mobile fronthaul, the overall latency due to both mobile-media access control (MAC) and PON-MAC processing is unacceptably large, especially for time-sensitive applications such as fifth generation (5G) RANs, which require a latency of less than one millisecond. Moving various C&M functions out of the eCPRI would increase the bandwidth efficiency and decrease overall latency of the eCPRI.

Disclosed herein is a C-RAN architecture comprising a first PON that implements eCPRI to exchange user data between the BBU and the RRUs, and a second PON, deployed substantially in parallel with the first PON, that exchanges C&M information for both the first PON and the second PON. The two PONs feature wavelength division multiplexing in some embodiments, such that each PON has its own upstream and downstream wavelengths. The two OLTs share an OLT memory in some embodiments, and the two ONUs share an ONU memory in some embodiments, where the OLT memory and the ONU memory can each store at least some of the C&M information. The C&M information can include some or all of ranging information, ONU registration information, ToD information, or DBA information. The two PONs are clock synchronized with the BBU and the RRU. Because the second PON is not involved in transmission of user data, the second PON can be a lower-data transfer rate, lower-cost PON, such as a GPON or an EPON, which reduces implementation costs.

Figure 1:
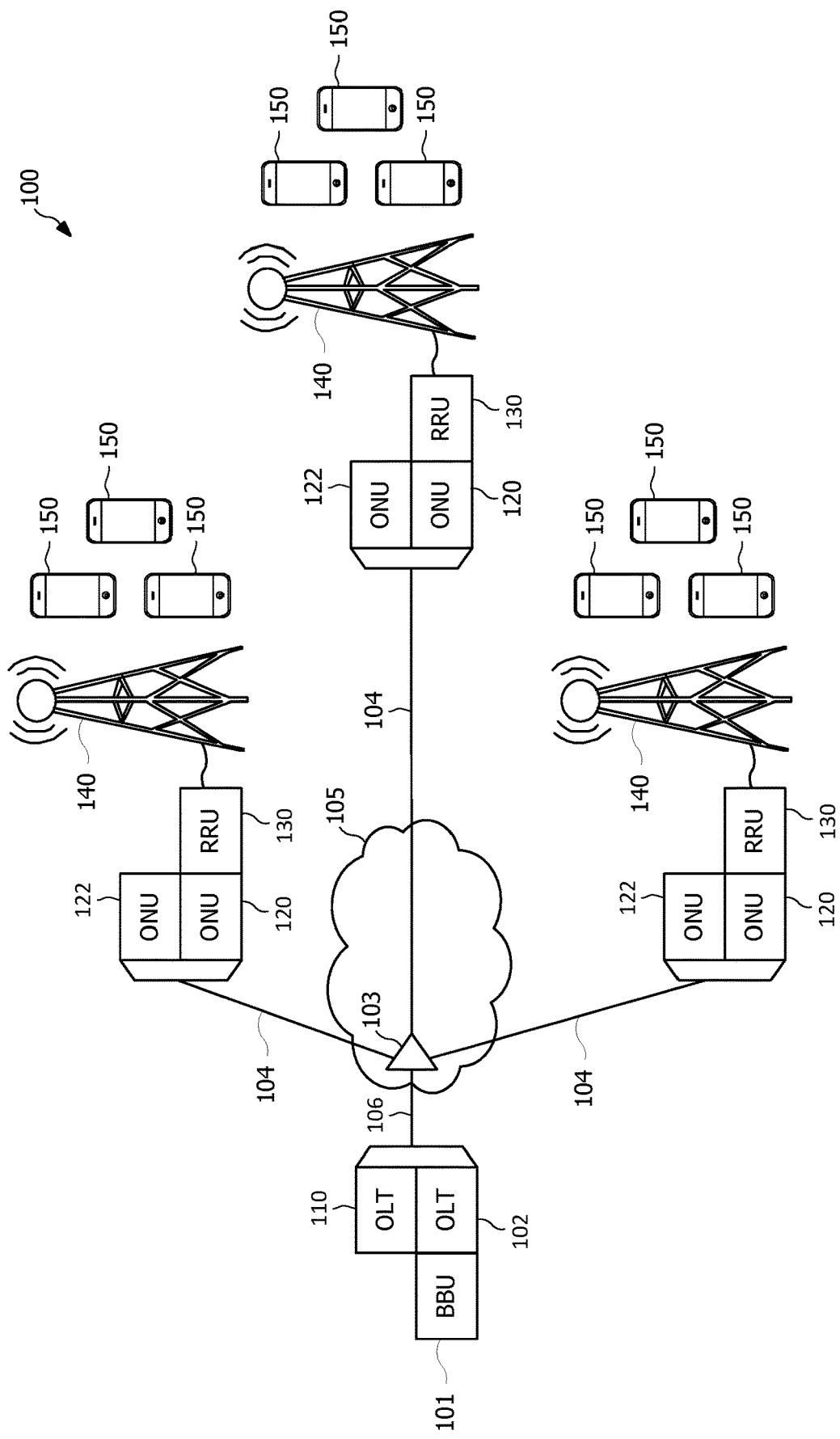
FIG. 1 illustrates a C-RAN in an embodiment.

FIG. 1 illustrates a C-RAN 100 in an embodiment. In the depicted embodiment, the C-RAN 100 comprises a BBU 101, a first OLT 102 and a second OLT 110 (collectively, OLTs 102, 110), an optical distribution network (ODN) 105, a first ONU 120 and a second ONU 122 (collectively, ONUs 120, 122), and a plurality of RRUs 130. The BBU 101 communicates with an upstream network (not shown) via electrical or optical means, for example. The RRUs 130 wirelessly communicate with various mobile devices 150, such as mobile telephones, tablets, or mobile computing devices, for example. The RRUs 130 can further communicate with other user devices or electronic devices. Such other devices are contemplated and are within the scope of the description and claims, including Internet of Things (IoT) devices and sensors, for example. The BBU 101 and the OLTs 102, 110 are located at a central location, such as a central office, whereas the ONUs 120, 122 and the RRUs 130 are located at remote locations, such as cellular towers 140. One or more of each of the ONUs 120, 122 may be located at each cellular tower 140, and each first ONU 120 may be associated with at least one RRU 130. In an embodiment, the first OLT 102 is integrated with the second OLT 110 such that they are part of a single device, but still maintain the functionality described herein. Similarly, in an embodiment the first ONU 120 is integrated with the second ONU 122 such that they are part of a single device, but still maintain the functionality described herein. While three cellular towers 140 are shown in FIG. 1, there may be more or fewer cellular towers in other embodiments of the C-RAN 100.

The first OLT 102 communicates with the first ONUs 120 via the ODN 105, thereby forming a first PON. Similarly, the second OLT 110 communicates with the second ONUs 122 via the same ODN 105, thereby forming a second PON. Each PON has a separate upstream and downstream transmission wavelength, which allows the PONs to be wavelength division multiplexed and share the ODN 105. In addition, each PON is a communication network that does not require any active components to distribute data between the OLTs 102, 110 and the ONUs 120, 122. Instead, each PON uses passive optical components in the ODN 105 to distribute data between the OLTs 102, 110 and the ONUs 120, 122. In an embodiment, the first PON and the second PON are part of a single PON.

In an embodiment, the BBU 101 is any device that is configured to implement base station functions, including base station C&M functions. As such, the BBU 101 provides many of the same functions as a radio element controller. In some embodiments, the BBU can provide backhaul transport processing, MAC layer processing, channel coding, channel interleaving, channel modulation, multiple input/multiple output (MIMO) processing, transmit power control of each physical channel, frame and slot signal, quadrature amplitude modulation (QAM) equalization, processed signal decoding, and forward error correction (FEC). Although only a single BBU 101 is illustrated in FIG. 1, a plurality of the BBUs 101 may be located at the central office to form a BBU pool. When the central office comprises multiple BBUs 101, the multiple BBUs 101 may be linked such that they share information, or they may be separated such that they are unable to communicate with each other.

The first OLT 102 is a device that is configured to communicate with the first ONUs 120 and the BBU 101. Specifically, the first OLT 102 forwards user data received from the BBU 101 to a first ONU or ONUs 120, and forwards user data received from the first ONUs 120 to the BBU 101. As used herein, user data is data that is exchanged between the BBU 101 and the RRU 130 using the first PON (e.g. the first OLT 102 and the first ONU 120), and that ultimately terminates or originates at the mobile device 150.

User data does not include C&M information. User data is not typically exchanged using the second PON (e.g. the second OLT 110 and the second ONU 122). However, the second PON may be used for some overflow user data that can tolerate the latency and/or reduced data transfer rate of the second PON.

The second OLT 110 is a device that is configured to communicate with the second ONUs 122, but not with the BBU 101 or the RRUs 130 in some embodiments. Instead, the second OLT 110 exchanges C&M information for the two PONs with the second ONUs 122. As used herein, the C&M information is any information used to control and/or manage the first PON and/or the second PON. C&M information does not include user data. Examples of C&M information include one or more of ranging information (e.g. the ranging delay), ONU registration information (e.g. the ONU's identifier (ID)), ToD information for synchronizing clock frequencies, or DBA information. The C&M information can be generated by any of the BBU 101, the first OLT 102, the second OLT 110, the first ONU 120, or the second ONU 122. The C&M information is not exchanged using the first PON (e.g. the first OLT 102 and the first ONU 120). In some embodiments, the first OLT 102 and the second OLT 110 are communicatively coupled to each other. Additionally or alternatively, the second OLT 110 may be communicatively coupled to the BBU 101. Additionally or alternatively, the second OLT 110 may be communicatively coupled to both the BBU 101 and the first OLT 102. In an embodiment, the first OLT 102 is co-located with the second OLT 110.

The ODN 105 is a passive optical data distribution system that does not require any power to distribute optical signals between the OLTs 102, 110 and the ONUs 120, 122. In the embodiment in FIG. 1, the ODN 105 comprises an optical trunk line 106, an optical splitter 103, and branching optical fibers 104. While the ODN 105 in FIG. 1 has a single splitter 103, the ODN 105 may be alternatively configured with multiple splitters 103. In various embodiments, the ODN 105 may also comprise optical couplers, distributors, multiplexers, and/or other optical equipment as needed to distribute the optical signals from the OLTs 102, 110 to the ONUs 120, 122.

The first ONUs 120 are devices that are configured to communicate with the first OLT 102 and the RRU 130. Specifically, each first ONU 120 forwards user data received from the respective RRUs 130 to the first OLT 102, and forwards user data received from the first OLT 102 to at least one RRU 130. In some embodiments, the second ONUs 122 are devices that are configured to communicate with the second OLT 110, but not with the BBU 101 or the RRUs 130. Instead, the second ONU 122 exchanges C&M information for the two PONs with the second OLT 110. As used herein, ONUs 120, 122 and optical network terminals (ONTs) are functionally similar, and thus the term "ONU" encompasses both ONUs and ONTs. In some embodiments, the first ONUs 120 and the second ONUs 122 are communicatively coupled to each other. Additionally or alternatively, the second ONUs 122 may be communicatively coupled to the RRUs 130. In an embodiment, the first ONU 120 is co-located with the second ONU 122.

The RRUs 130 are devices that wirelessly communicate with one or more mobile devices 150 via antennas (not shown) on the cellular towers 140. The RRUs 130 are located at a cellular tower 140 (such as an evolved node B (eNode B or eNB)). The RRUs 130 perform radio functions, including frequency conversion, amplification, channel filtering, carrier multiplexing, analog to digital (A/D) conversion, digital to analog (D/A) conversion, cyclic prefix removal/addition, fast Fourier transform (FFT)/inverse FFT (IFFT) processing, and resource block mapping/demapping. To perform these functions, the RRUs 130 may comprise power amplifiers, duplexers, and digital signal processors. In an embodiment, the RRUs 130 operate at the same one or same set of carrier frequencies.

Figure 2:
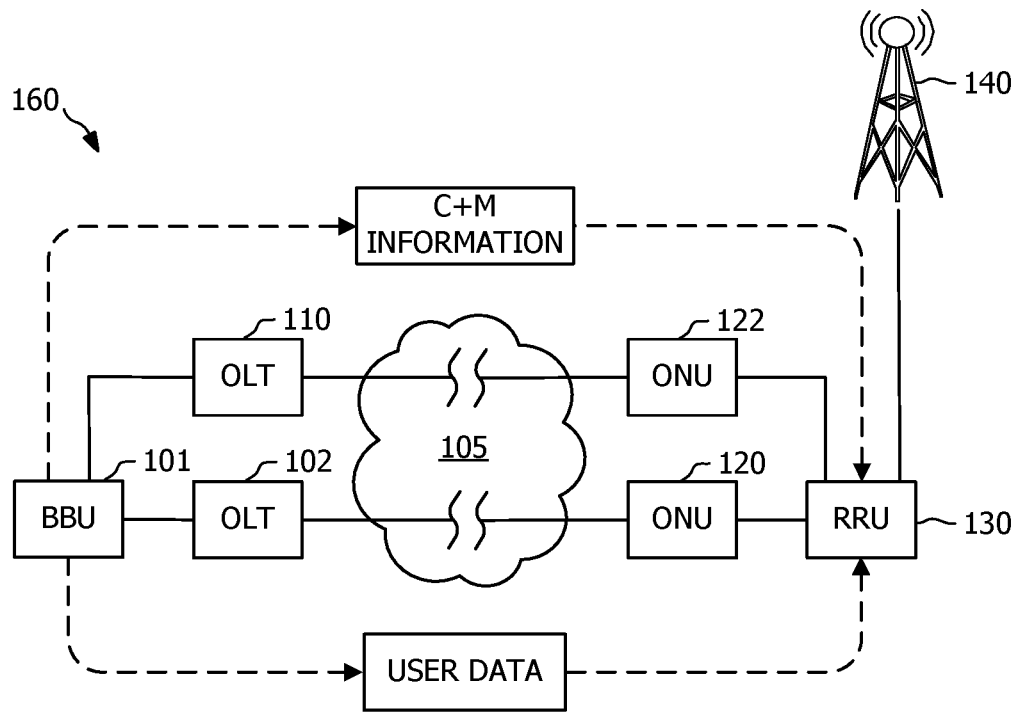
FIG. 2 illustrates a C-RAN in another embodiment.

FIG. 2 illustrates a C-RAN 160 in another embodiment. In the C-RAN 160, the user data passes from the BBU 101 to the first OLT 102, to the ODN 105, to the first ONU 120, and to the RRU 130 connected to antennas (not shown) on the cellular towers 140. In an embodiment, the C&M information passes from the BBU 101 to the second OLT 110, to the ODN 105, to the second ONU 122, and to the RRU 130. Thus, FIG. 2 illustrates an embodiment where C&M information flows from the BBU 101 to the second PON and to the RRU 130 without passing through the first PON.

Figure 3:
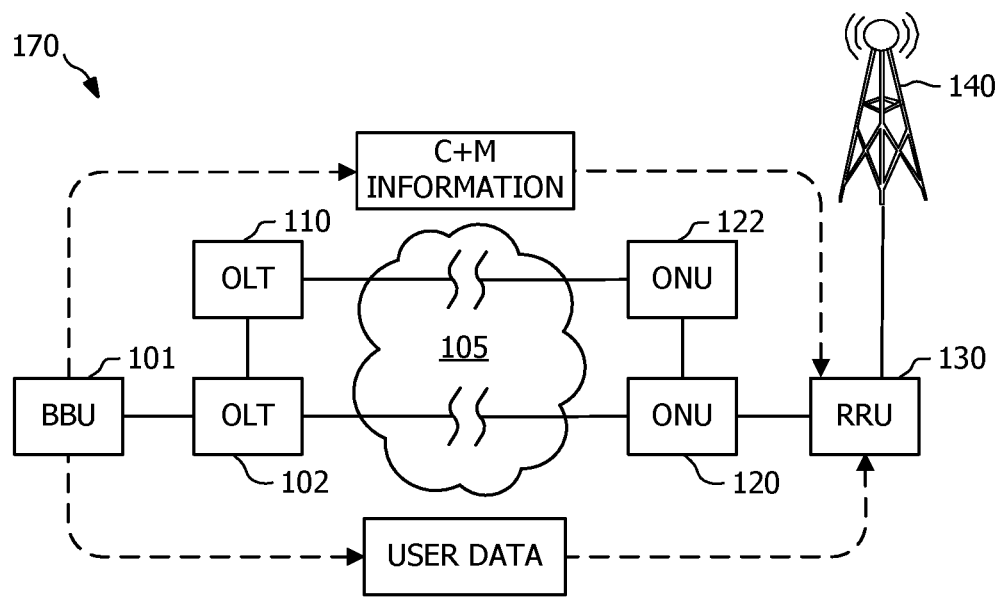
FIG. 3 illustrates a C-RAN in another embodiment.

FIG. 3 illustrates a C-RAN 170 in another embodiment. In the C-RAN 170, user data passes from the BBU 101 to the first OLT 102, to the ODN 105, to the first ONU 120, and to the RRU 130 connected to antennas (not shown) on the cellular towers 140. However, the C&M information in FIG. 3 passes from the BBU 101 to the first OLT 102, to the second OLT 110, to the ODN 105, to the second ONU 122, to the first ONU 120, and to the RRU 130. Thus, FIG. 3 illustrates an embodiment where C&M information flows from the BBU 101 to the first OLT 102, to the second PON, to the first ONU 120, and to the RRU 130.

Figure 4:
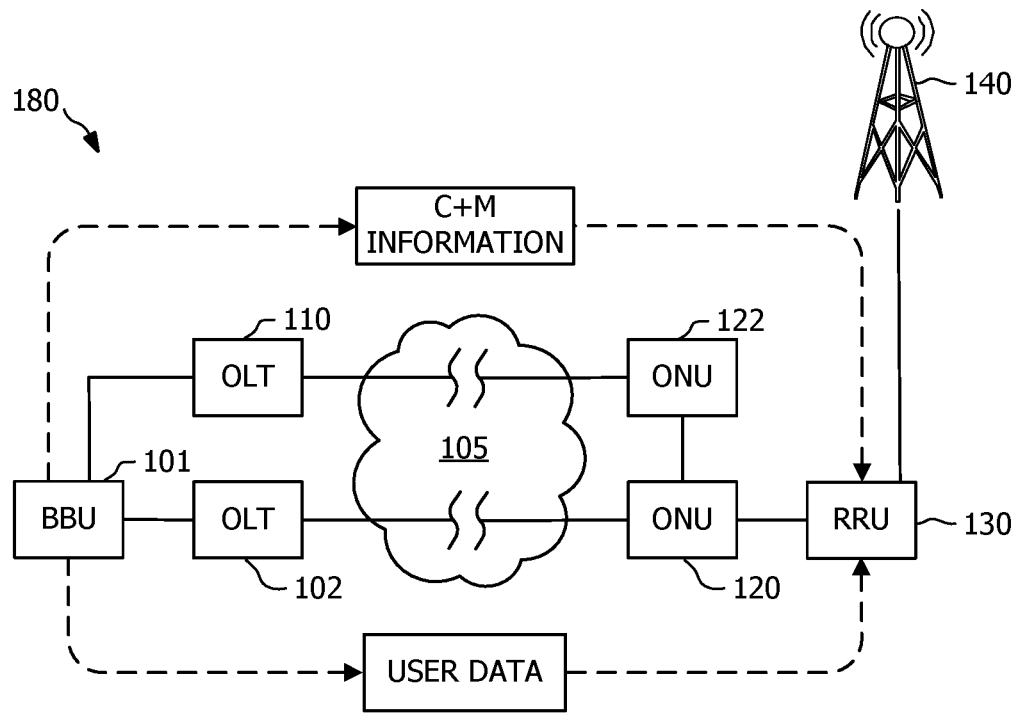
FIG. 4 illustrates a C-RAN in another embodiment.

FIG. 4 illustrates a C-RAN 180 in another embodiment. In the C-RAN 180, user data passes from the BBU 101 to the first OLT 102, to the ODN 105, to the first ONU 120, and to the RRU 130 connected to antennas (not shown) on the cellular towers 140. However, the C&M information in FIG. 4 passes from the BBU 101 to the second OLT 110, to the ODN 105, to the second ONU 122, to the first ONU 120, and to the RRU 130. Thus, FIG. 4 illustrates an embodiment where C&M information flows from the BBU 101 directly to the second PON (e.g. bypassing the first OLT 102), to the first ONU 120, and to the RRU 130.

Figure 5:
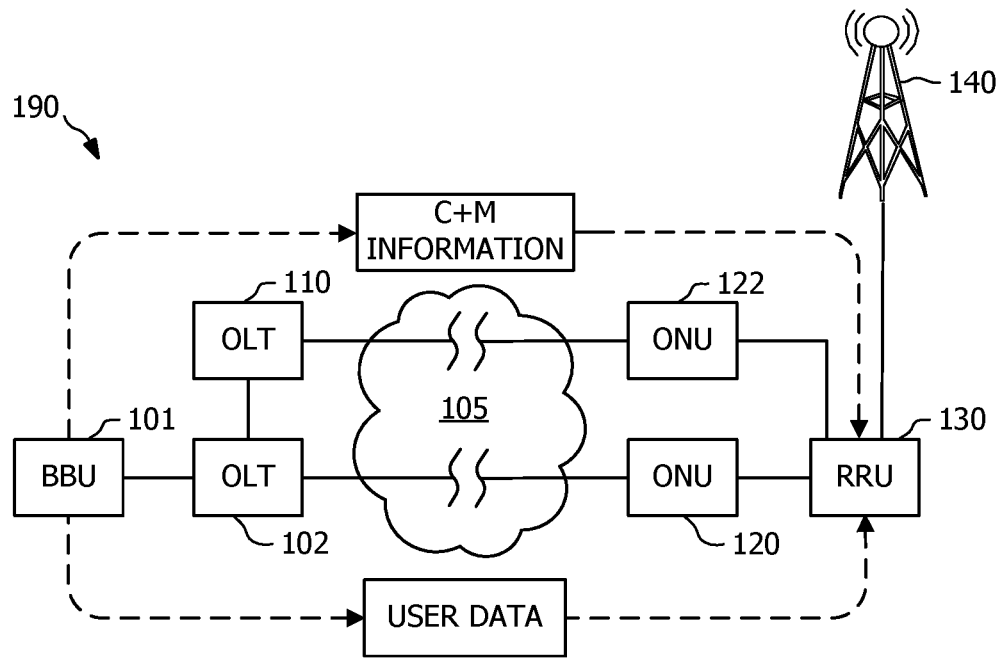
FIG. 5 illustrates a C-RAN in another embodiment.

FIG. 5 illustrates a C-RAN 190 in another embodiment. In the C-RAN 190, user data passes from the BBU 101 to the first OLT 102, to the ODN 105, to the first ONU 120, and to the RRU 130 connected to antennas (not shown) on the cellular towers 140. However, the C&M information in FIG. 5 passes from the BBU 101 to the first OLT 102, to the second OLT 110, to the ODN 105, to the second ONU 122, and to the RRU 130. Thus, FIG. 5 illustrates an embodiment where C&M information flows from the BBU 101 to the first OLT 102, to the second PON, and directly to the RRU 130 (e.g. bypassing the first ONU 120).

Figure 6:
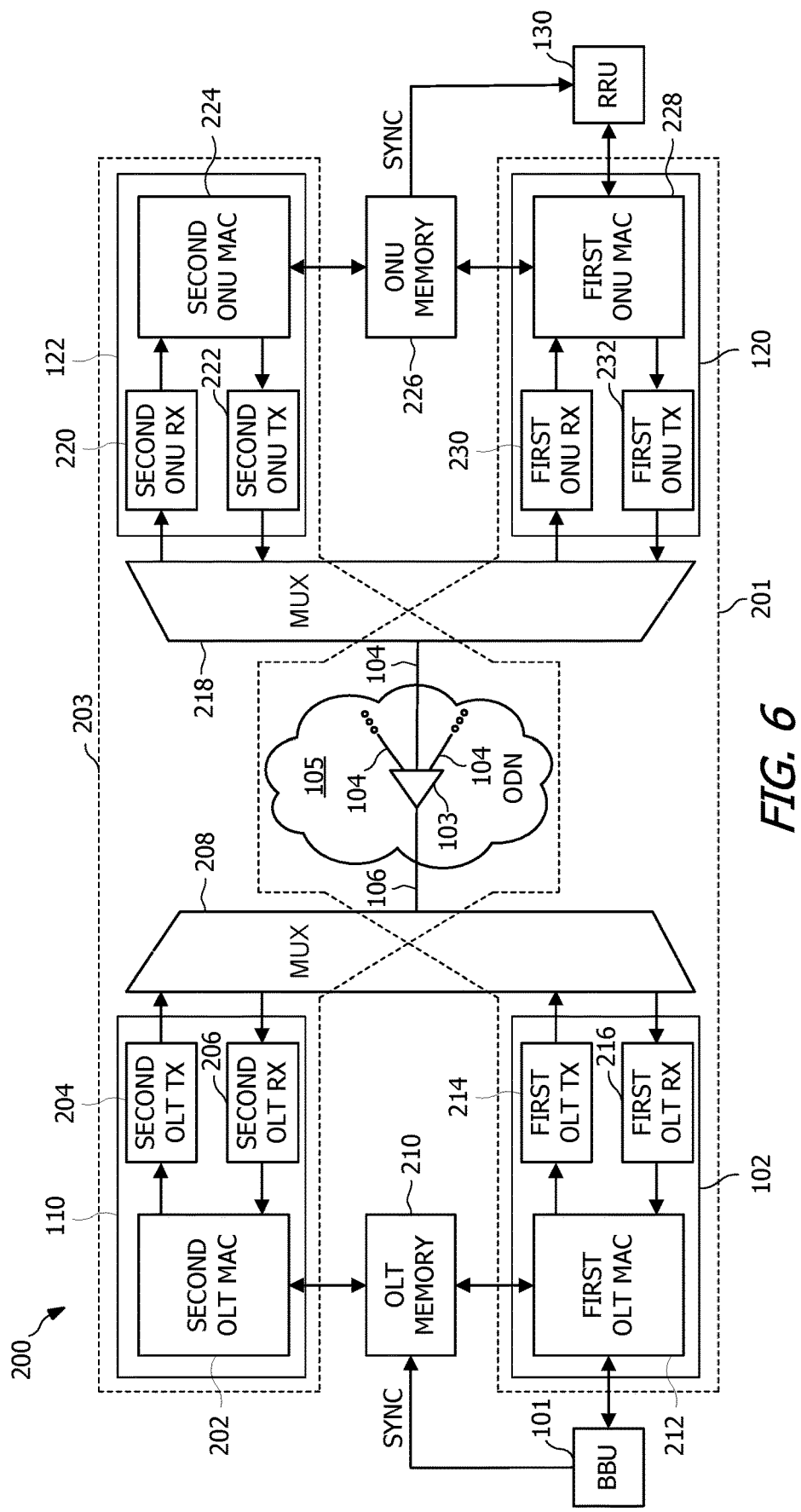
FIG. 6 illustrates a PON portion of the C-RAN in an embodiment.

FIG. 6 illustrates the PON portion 200 of the C-RAN in an embodiment. Specifically, the PON portion 200 comprises the first PON 201, which comprises the first OLT 102, a first optical multiplexer 208, the ODN 105, a second optical multiplexer 218, and the first ONU 120. The PON portion 200 also comprises the second PON 203, which comprises the second OLT 110, the first optical multiplexer 208, the ODN 105, the second optical multiplexer 218, and the second ONU 122. The OLTs 102, 110 are each coupled to an OLT memory 210 and the first optical multiplexer 208, whereas the first OLT 102, but not the second OLT 110, is coupled to the BBU 101. Similarly, the ONUs 120, 122 are each coupled to an ONU memory 226 and the second optical multiplexer 218, whereas the first ONU 120, but not the second ONU 122, is coupled to the RRU 130.

As mentioned above, the first PON 201 is a high-data transfer rate PON that allows user data to be exchanged between the BBU 101 and the RRUs 130. In one embodiment, the first PON 201 transmits both upstream and downstream messages at a first rate, such as 25 Gigabit per second (Gb/s) using a frame-and-timeslot arrangement similar to GPON, which is defined by International Telecommunication Union Telecommunications Standardization Sector (ITU-T) G.984. In another embodiment, the receivers in the first PON 201 include A/D converters and optical digital signal processors (oDSPs), which allows the upstream and downstream messages to be transmitted at 50 Gb/s. In yet another embodiment, the transmitters in the first PON 201 implement advanced modulation formats, such as DMT or PAM4, and the receivers in the first PON 201 include A/D converters and oDSPs, which allow the upstream and downstream messages to be transmitted at 100 Gb/s.

The first PON 201 implements eCPRI to exchange data (e.g. user data) between the BBU 101 and the RRUs 130. eCPRI provides a transport network interface between the eCPRI radio equipment controller (e.g. the BBU 101) and the eCPRI radio equipment (e.g. the RRUs 130). While eCPRI can be implemented using Ethernet, it can also be implemented using other packet-based protocols, such as Internet Protocol (IP) and multi-protocol label switching (MPLS). As such, the first PON 201 implements a packet-based transport protocol, such as Ethernet, IP, or MPLS, to transport the user data from the BBU 101 to the RRUs 130. The eCPRI meets the latency requirements of 5G systems, and is able to achieve a latency of less than 100 microseconds. Specifically, the first PON described herein is configured to transmit upstream and downstream user data in bursts that are cycled at a time interval that is less than or equal to 100 microseconds in some embodiments.

In an embodiment, the eCPRI represents the functional split between the RRUs 130 and the BBU 101. Some fronthaul configurations limit the functions performed at the RRU 130 to radio frequency (RF)-to-baseband conversion and A/D conversion. In such instances, the BBU 101 has to perform many functional steps, including cyclic prefix removal, performing FFT, resource block demapping, QAM equalization and processed signal decoding, and forward error correction. In an embodiment, eCPRI moves various functions, such as cyclic prefix removal, performing FFT, and resource block demapping, for example, from the BBU 101 to the RRUs 130. Such a configuration improves the operational efficiency of the mobile fronthaul.

The second PON 203 supports the first PON 201 by handling the C&M information exchange that would normally be handled by the first PON 201. Specifically, the C&M information for the first PON 201 is exchanged through the second OLT 110 and the second ONU 122 at a second rate instead of through the first OLT 102 and the first ONU 120 at a first rate. In some embodiments, the second PON 203 features a lower data transfer rate, wherein the second PON 203 transfers data at a second rate that is slower than the first rate, wherein the first rate is used for transferring user data. In some embodiments, the second PON 203 is a GPON as defined by ITU-T G.984 or an EPON as defined by Institute of Electrical and Electronics Engineers (IEEE) 802.3ah. These networks typically have data transfer rates of 1 Gb/s, 1.25 Gb/s, or 2.5 Gb/s. Alternatively, the second PON 203 may be a ten Gb/s GPON (XGPON) as defined by ITU-T G.987, a 10G-EPON as defined by the IEEE 802.3av, or a broadband PON (BPON) or an asynchronous transfer mode PON (APON) as defined by ITU-T G.983.

The OLT memory 210 is a volatile or non-volatile memory structure configured to store the C&M information, and may store other data, such as computer executable instructions, machine code, and other various forms of data. For example, the OLT memory 210 stores ToD information received from the BBU 101 or any other central office component (e.g. as described in IEEE 1588), and is accessible by the OLTs 102, 110. In addition, the OLT memory 210 stores ranging information, registration information, and bandwidth allocation information for the ONUs 120, 122, which is accessible by all OLTs 102, 110. In an embodiment, the bandwidth information is periodically adjusted to give each ONU 120, 122 more or less bandwidth as needed. The OLT memory 210 also stores any other information needed by the OLTs 102, 110.

The first OLT 102 comprises a first OLT MAC component 212, a first OLT transmitter 214, and a first OLT receiver 216. The first OLT MAC component 212 receives downstream user data from the BBU 101, performs any needed MAC processing, and sends the downstream user data to the RRU 130 via the first optical multiplexer 208, the ODN 105, the second optical multiplexer 218, and the first ONU 120. The process is reversed for upstream user data. In an embodiment, the first OLT MAC component 212 is a processor configured to implement the functional steps described here. In another embodiment, the first OLT MAC component 212 is a processor that executes instructions stored in a memory (e.g. OLT memory 210) to perform the functional steps described herein. The first OLT transmitter 214 comprises an electrical to optical (E/O) converter, such as a laser diode, and optionally comprises a digital to analog converter (DAC) upstream of the E/O converter. These components allow the first OLT transmitters 214 to receive electrical signals from the first OLT MAC component 212, convert the electrical signals into optical signals, and transmit the optical signals through the ODN 105 via the first optical multiplexer 208. The first OLT receiver 216 comprises an optical to electrical (O/E) converter, such as a photodiode, and optionally comprises an ADC downstream of the O/E converter. These components allow the first OLT receiver 216 to convert the optical signals received from the ODN 105 into electrical signals that are then passed to the first OLT MAC component 212.

The second OLT 110 comprises a second OLT MAC component 202, a second OLT transmitter 204, and a second OLT receiver 206. In some cases, the second OLT MAC component 202 obtains C&M information (e.g. ToD information and DBA information) from the OLT memory 210, performs any needed MAC processing, and sends the C&M information to the second ONU 122 via the first optical multiplexer 208, the ODN 105, and the second optical multiplexer 218. In other cases, the second OLT MAC component 202 requests C&M information (e.g. registration information for the ONUs 120) from the second ONU 122, receives the C&M information from the second ONU 122 via the second optical multiplexer 218, the ODN 105, and the first optical multiplexer 208, performs any MAC processing, and stores the C&M information in the OLT memory 210. In an embodiment, the ONUs 120, 122 are physically close to each other, in which case the second OLT MAC component 202 can assume that the ranging information for the ONUs 120, 122 is the same, and can store a common ranging delay for both the ONUs 120, 122 in the OLT memory 210. In an embodiment, the second OLT MAC component 202 is a processor configured to implement the functional steps described here. In another embodiment, the second OLT MAC component 202 is a processor that executes instructions stored in a memory (e.g., OLT memory 210) to perform the functional steps described herein. The second OLT transmitter 204 and the second OLT receiver 206 are similar to the first OLT transmitter 214 and the first OLT receiver 216, respectively.

The first optical multiplexer 208 and the second optical multiplexer 218 are any optical components that can separate a combined light stream into its separate wavelengths (or wavelength bands), and vice-versa. Specifically, the first optical multiplexer 208 and the second optical multiplexer 218 are configured to wavelength division multiplex light signals in one direction and wavelength division demultiplex light signals in the opposite direction. In one embodiment, the first optical multiplexer 208 and the second optical multiplexer 218 are arrayed waveguide gratings (AWGs). The optical multiplexers 208, 218 may also be referred to as wavelength multiplexers.

The ONU memory 226 is a volatile or non-volatile memory structure configured to store the C&M information, but also may store other data, such as computer executable instructions, machine code, and other various forms of data. For example, the ONU memory 226 stores synchronization information and ToD information received from the second OLT 110. The synchronization information and ToD information is accessible by the ONUs 120, 122 and the RRUs 130 or any other co-located equipment (e.g. as described in IEEE 1588). In addition, the ONU memory 226 stores ranging information, registration information, and bandwidth allocation information for the ONUs 120, 122, which is accessible by the ONUs 120, 122. As described above, DBA may be periodically performed to give each ONU 120, 122 more or less bandwidth as needed.

The first ONU 120 comprises a first ONU MAC component 228, a first ONU transmitter 232, and a first ONU receiver 230. The first ONU MAC component 228 receives upstream user data from the RRU 130 and sends the upstream user data to the BBU 101 via the second optical multiplexer 218, the ODN 105, the first optical multiplexer 208, and the first OLT 102. The process is reversed for downstream data. In an embodiment, the first ONU MAC component 228 is a processor configured to implement the functional steps described here. In another embodiment, the first ONU MAC component 228 is a processor that executes instructions stored in a memory (e.g. ONU memory 226) to perform the functional steps described herein. The first ONU transmitter 232 and the first ONU receiver 230 are similar to the first OLT transmitter 214 and the first OLT receiver 216, respectively.

The second ONU 122 comprises a second ONU MAC component 224, a second ONU transmitter 222, and a second ONU receiver 220. In some cases, the second ONU MAC component 224 receives C&M information (e.g. ToD information and DBA information) from the second OLT 110 via the first optical multiplexer 208, the ODN 105, and the second optical multiplexer 218, and stores that C&M information in the ONU memory 226. In other cases, C&M information (e.g. ranging information and registration information for the second ONU 122) is generated by the second ONU MAC component 224, and reported to the second OLT 110 via the second optical multiplexer 218, the ODN 105, and the first optical multiplexer 208. In yet other cases, the C&M information (e.g. ranging information and registration information for the first ONU 120) is generated by the first ONU MAC component 228 and stored in the ONU memory 226 for access by the second ONU MAC component 224. In that case, the second OLT MAC 224 retrieves the C&M information from the ONU memory 226 and reports the C&M information to the second OLT 110 via the second optical multiplexer 218, the ODN 105, and the first optical multiplexer 208. In an embodiment, the second ONU MAC component 224 is a processor configured to implement the functional steps described here. In another embodiment, the second ONU MAC component 224 is a processor that executes instructions stored in a memory (e.g. ONU memory 226) to perform the functional steps described herein. The second ONU transmitter 222 and the second ONU receiver 220 are similar to the first OLT transmitter 214 and the first OLT receiver 216, respectively.

The optical signals transmitted by the first OLT transmitter 214 and the second OLT transmitter 204 are multiplexed by the first optical multiplexer 208, distributed through the ODN 105, and demultiplexed by the second optical multiplexer 218 before arriving at the first ONU receiver 230 and the second ONU receiver 220, respectively. Similarly, the optical signals transmitted by the first ONU transmitter 232 and the second ONU transmitter 222 are multiplexed by the second optical multiplexer 218, are distributed through the ODN 105, and are demultiplexed by the first optical multiplexer 208 before arriving at the first OLT receiver 216 and the second OLT receiver 206, respectively.

Each optical transmitter is assigned its own wavelength so that the various optical signals do not interfere with each other. These wavelengths correspond to the coarse WDM (CWDM) spacing grid as defined in ITU-T G.694.2. However, dense WDM (DWDM) (as defined in ITU-T G.694.1 or other spacing grid) may also be used. In an embodiment, the first OLT transmitter 214 can be configured to transmit at 1350±10 nanometers (nm), the second OLT transmitter 204 can be configured to transmit at 1490±10 nm, the first ONU transmitter 232 can be configured to transmit at 1270±10 nm, and the second ONU transmitter 222 can be configured to transmit at 1310±10 nm, for example. By using wavelength multiplexing, the OLTs 102, 110 and ONUs 120, 122 do not interfere with each other.

Figure 7:
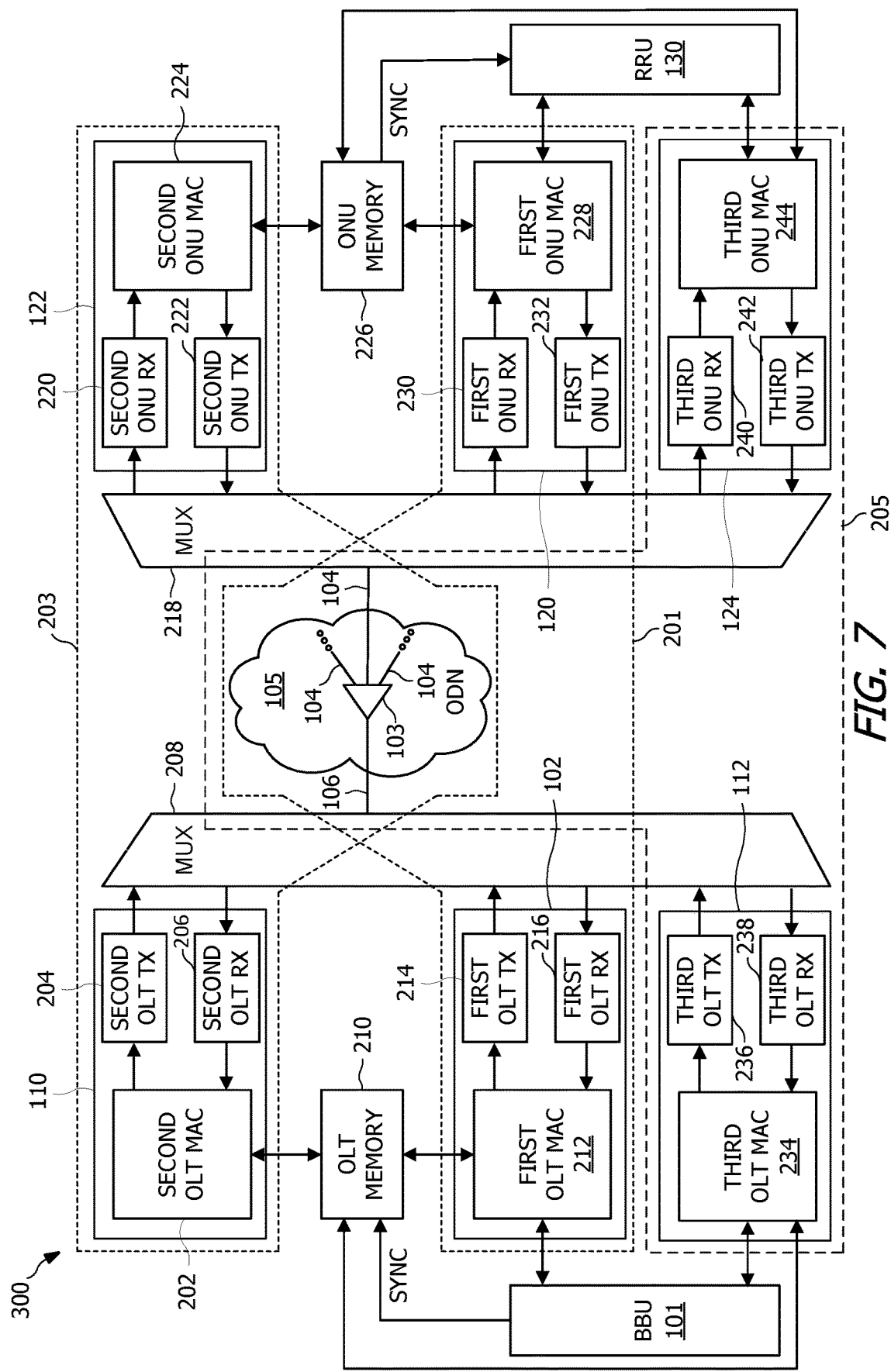
FIG. 7 illustrates the PON portion of the C-RAN in an embodiment.

FIG. 7 illustrates the PON portion 300 of the C-RAN in an embodiment. The PON portion 300 is substantially the same as the PON portion 200 described above, but comprises a third PON 205. The third PON 205 comprises a third OLT 112, optical multiplexers 208, 218, the ODN 105, and a third ONU 124. The third OLT 112 comprises a third OLT MAC component 234 coupled to the OLT memory 210 and the BBU 101, a third OLT transmitter 236 coupled to the third OLT MAC component 234 and the first optical multiplexer 208, and a third OLT receiver 238 coupled to the third OLT MAC component 234 and the first optical multiplexer 208. Alternatively, the third OLT MAC component 234 is coupled to and communicates with a different BBU (not shown) than the BBU 101. The third ONU 124 comprises a third ONU MAC component 244 coupled to the ONU memory 226 and the RRU 130, a third ONU transmitter 242 coupled to the third ONU MAC component 244 and the second optical multiplexer 218, and a third ONU receiver 240 coupled to the third ONU MAC component 244 and the second optical multiplexer 218. Alternatively, the third ONU MAC component 244 is coupled to and communicates with a different RRU (not shown) than the RRU 130. The third OLT MAC component 234, the third OLT transmitter 236, the third OLT receiver 238, the third ONU transmitter 242, the third ONU receiver 240, and third ONU MAC component 244 are similar in structure and function to the first OLT MAC component 212, the first OLT transmitter 214, the first OLT receiver 216, the first ONU transmitter 232, the first ONU receiver 230, and first ONU MAC component 228, respectively.

In one embodiment, the third PON 205 is wavelength division multiplexed with the first PON 201 and the second PON 203 such that the third PON 205 operates at upstream and downstream wavelengths that are different from the first PON 201 and the second PON 203. Use of the third PON 205 can expand the available bandwidth for transferring user data, for example. In an embodiment, the first OLT transmitter 214 can be configured to transmit at 1350±10 nm, the second OLT transmitter 204 can be configured to transmit at 1490±10 nm, the third OLT transmitter 236 can be configured to transmit at 1330±10 nm, the first ONU transmitter 232 can be configured to transmit at 1270±10 nm, the second ONU transmitter 222 can be configured to transmit at 1310±10 nm, and the third ONU transmitter 242 can be configured to transmit at 1290±10 nm, for example. In another embodiment, the third PON 205 is time division multiplexed with either the first PON 201 or the second PON 203 such that the third PON 205 operates at upstream and downstream wavelengths that are the same as the first PON 201 or the second PON 203, but uses time division multiplexing (TDM)/time division multiple access (TDMA) to transmit downstream/upstream messages using the upstream and downstream wavelengths.

Figure 8:
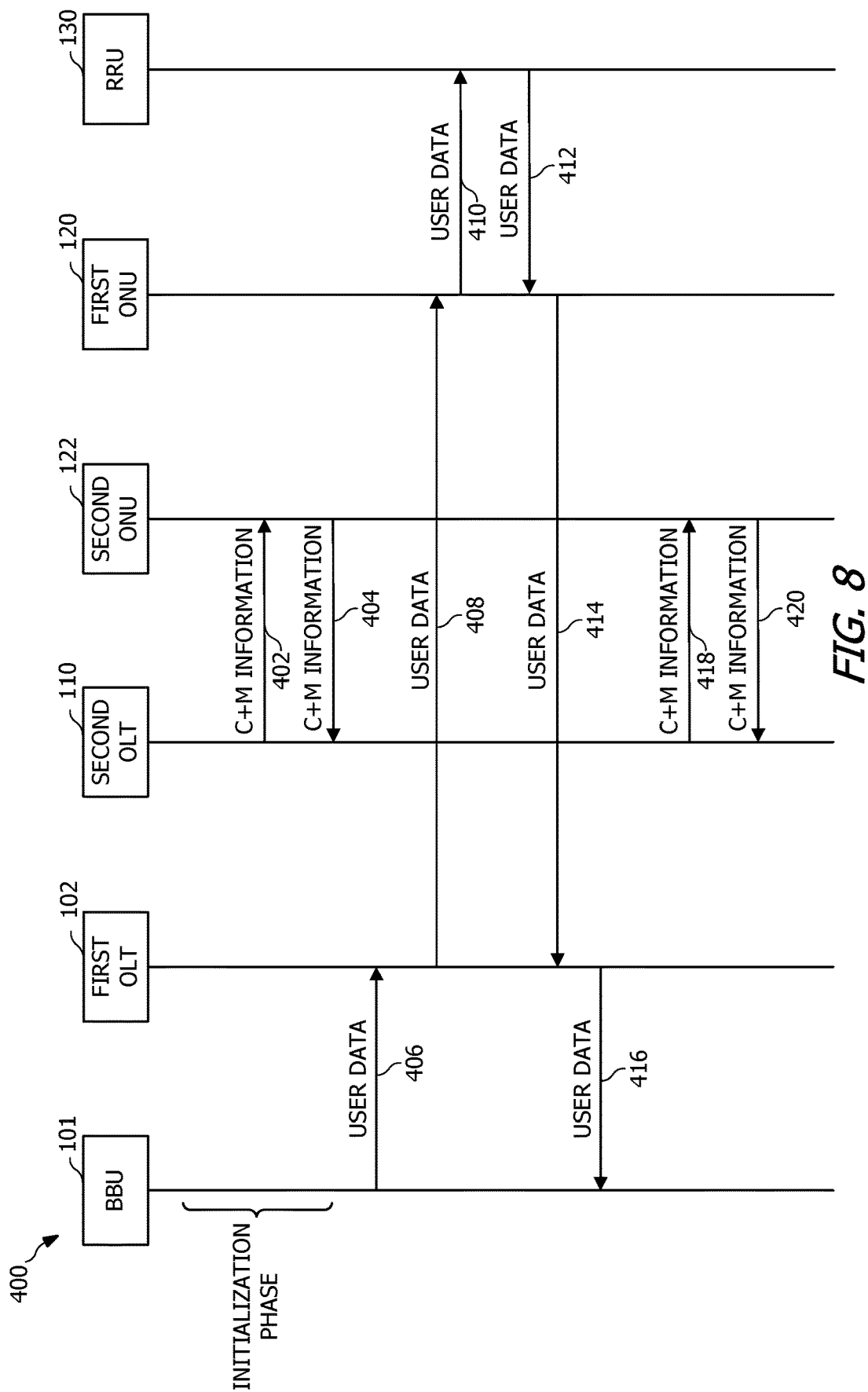
FIG. 8 is a protocol diagram of a method for using the C-RAN in an embodiment.

FIG. 8 is a protocol diagram of a method 400 for using the PON portion of the C-RAN in an embodiment. When an ONU (e.g. one of ONUs 120, 122) is added to the either the first PON or the second PON, the second OLT 110 sends a first C&M information message 402 to the second ONU 122 at a second rate. In one embodiment, the first C&M information message 402 includes a request for C&M information, such as ranging information and/or registration information for the newly added ONU. Upon receipt of the first C&M information message 402, the second ONU 122 determines whether it possesses the requested C&M information. If the second ONU 122 does not already possess the requested C&M information, the second ONU 122 accesses the ONU memory (e.g. ONU memory 226; not shown in FIG. 8) to obtain the requested C&M information (such would be the case for registration information for the first ONU 120). If the second ONU 122 already possesses the requested information, the second ONU 122 does not need to access the ONU memory (such would be the case for registration information for the second ONU 122). The second ONU 122 then sends a first C&M information response 404 to the second OLT 110 with the requested C&M information, at which point the second OLT 110 stores the C&M information in the OLT memory (e.g. OLT memory 210, not shown in FIG. 8).

In an alternative embodiment, the first C&M information message 402 includes C&M information obtained from the OLT memory, such as ToD information and/or bandwidth assignments for the first ONU 120 and/or the second ONU 122 (e.g. DBA information). Upon receipt of the first C&M information message 402, the second ONU 122 stores the C&M information in the ONU memory. The second ONU 122 then sends the first C&M information response 404 to the second OLT 110 acknowledging receipt of the C&M information. In either embodiment, the exchange of the first C&M information message 402 and the first C&M information response 404 occurs through the ODN (not shown in FIG. 8) and may occur as many times as needed to properly configure all the components of the first PON and the second PON.

In either embodiment, the first OLT 102 and the second OLT 110 use the C&M information stored in the OLT memory, and the first ONU 120 and the second ONU 122 use the C&M information stored in the ONU memory. Recall that the BBU 101 (or another central office component) provides certain C&M information (e.g. ToD information) to the OLT memory. When the first OLT 102 and the second OLT 110 use the ToD information to set their clocks, the first OLT 102 and the second OLT 110 will be time synchronized with the BBU 101. In addition, since the second OLT 110 shares the ToD information with the second ONU 122 and the second ONU 122 can use the ToD information to set its clock, the second ONU 122 is time synchronized with the BBU 101, the first OLT 102, and the second OLT 110. Finally, recall that the second ONU 122 stores the ToD information in the ONU memory where it can be accessed by the first ONU 120 and the RRU 130. Since the first ONU 120 and the RRU 130 can use the ToD information to set their clocks, the first ONU 120 and the RRU 130 are time synchronized with the BBU 101, the first OLT 102, the second OLT 110, and the second ONU 122. Generally, the first C&M information message 402 and the first C&M information response 404 can be referred to as an initialization phase.

At some point, the BBU 101 receives user data destined for the RRU 130, e.g. from an upstream network (not shown). The BBU 101 sends the user data to the first OLT 102 in a first user data message 406. The first OLT 102 then sends the user data to the first ONU 120 in a second user data message 408, which may be an eCPRI message. The second user data message 408 is sent at a first rate, which is faster than the second rate. For example, the first rate can be 50 Gb/s and the second rate can be 2.5 Gb/s, as described above. The user data is therefore transferred at a higher data rate than the C&M information in this embodiment. In addition, the second user data message 408 traverses the same ODN as the first C&M information message 402 and the first C&M information response 404. The first ONU 120 then sends the user data to the RRU 130 in a third user data message 410. The user data carried in the user data messages 406, 408, 410 may comprise many types of data, but does not comprise any of the C&M information in some embodiments.

Also at some point, the RRU 130 receives user data destined for the BBU 101, e.g. from a mobile device (not shown). The RRU 130 sends the user data to the first ONU 120 in a fourth user data message 412. The first ONU 120 then sends the user data to the first OLT 102 in a fifth user data message 414, which may be an eCPRI message. The fifth user data message 414 is typically sent at the first rate. The fifth user data message 414 traverses the same ODN as the first C&M information message 402 and the first C&M information response 404. The first OLT 102 then sends the user data to the BBU 101 in a sixth user data message 416. The user data carried in the user data messages 412, 414, 416 may comprise many types of data, but does not comprise any of the C&M information.

At various points, the second OLT 110 and the second ONU 122 need to exchange additional C&M information. In such as case, the second OLT 110 sends a second C&M information message 418 to the second ONU 122, where the second C&M information message 418 either comprises at least some of the C&M information, or requests at least some of the C&M information (e.g. similar to the first C&M information message 402). The second ONU 122 then sends a second C&M information response 420 to the second OLT 110, where the second C&M information response 420 either acknowledges receipt of the C&M information, or replies with at least some of the C&M information (e.g. similar to the first C&M information response 404). The exchange of the second C&M information message 418 and/or the second C&M information response 420 is shown happening subsequent to user data messages 406, 408, 410, 412, 414, 416, but may also happen concurrently with the exchange of user data messages 406, 408, 410, 412, 414, and 416. Alternatively, the second C&M information message 418 and/or the second C&M information response 420 may occur before any of the user data messages 412, 414, and 416.

In embodiments such as PON portion 300, where there is a third OLT and a third ONU, the method 400 may be expanded to include, for example, the C&M information carried in the first C&M information message 402 and/or the first C&M information response 404 can include the C&M information for the third OLT and the third ONU. In addition, the BBU 101 and the RRU 130 can exchange user data using the third OLT and the third ONU in a manner similar to user data messages 406, 408, 410, 412, 414, and 416.

The data transfer rate of the first PON relative to the second PON is a consideration when designing and operating the first PON and the second PON (and optionally the third PON). Specifically, clock inaccuracy is a function of the TQ of the OLT, and the TQ of the OLT is a factor of the PON data transfer rate. As used herein, TQ is the smallest time unit available in the OLTs and/or the ONUs. TQ is functionally the same as envelope quanta (EQ), and thus the term "TQ" includes both TQ and EQ. Table 1 below illustrates the relationship between PON data transfer rate, MAC frequency/time period, and OLT/ONU TQ:

TABLE 1

| | PON Speed (Gb/s) | | | | | | |
|---|---|---|---|---|---|---|---|
| | 1 | 1.25 | 2.5 | 10 | 25 | 50 | 100 |
| MAC frequency/ time period | 125 MHz/ 8 ns | 156.25 MHz/ 6.4 ns | 156.25 MHz/ 3.2 ns | 156.25 MHz/ 6.4 ns | 390.625 MHz/ 2.56 ns | 390.625 MHz/ 2.56 ns | 390.625 MHz/ 2.56 ns |
| Time per 8 bytes | 64 ns | 51.2 ns | 25.6 ns | 6.4 ns | 2.56 ns | 1.28 ns | 0.64 ns |
| TQ units per 8 bytes | 100 | 80 | 40 | 10 | 4 | 2 | 1 |

Selection of a base TQ that can be multiplied by an integer to obtain other TQs allows the clocks in OLTs and ONUs of different rates to be synchronized. For example, if the first PON operates at 100 Gb/s, a first clock in the first OLT and a second clock in the first ONU have a TQ of 0.64 ns. A 0.64 ns TQ is beneficial because it can be multiplied by an integer multiple (e.g. 2, 3, 4, 5, etc.) to obtain any of the TQs shown in FIG. 1. For example, the second PON can operate at 2.5 Gb/s, and as such a third clock in the second OLT and a fourth clock in the second ONU will have at TQ of 25.6 ns. Moreover, a TQ of 0.64 ns has a multipoint control protocol (MPCP) clock inaccuracy of ±0.32 ns. The TDMA scheme used in the EPON has ±12 TQ of tolerance (called the guardThresholdOLT), so the resulting TimeStamp drift error is reduced to ±7.68 ns (12 TQ*0.64 ns/TQ). Assuming that the fiber propagation induced timing error is ±5 ns, the total timing error will be ±13 ns. However, if ±13 ns accuracy is insufficient, the first PON can take multiple ToD measurements per time period (e.g. hour, day, etc.) and perform averaging to increase the accuracy of the ToD measurements fed to the second PON.

Figure 9:
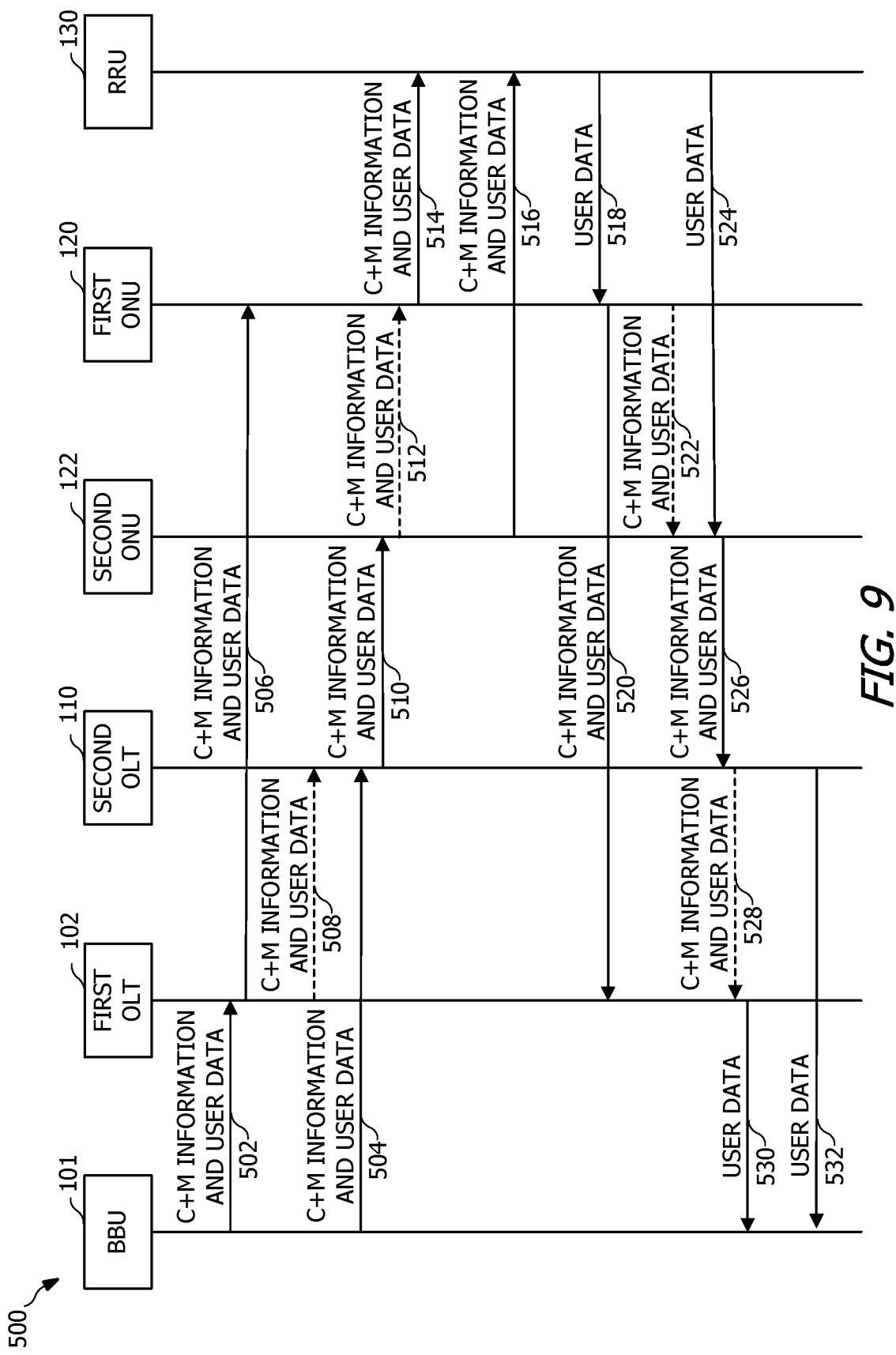
FIG. 9 is a protocol diagram of a method for using the C-RAN in another embodiment.

FIG. 9 shows a protocol diagram of a method 500 for using the C-RAN according to another embodiment. FIG. 9 is an alternative method to FIG. 8. In this embodiment, the BBU 101 sends the user data to the first OLT 102 in a first message 502. However, in this embodiment the BBU 101 also sends the user data directly to the second OLT 110 (e.g. bypassing the first OLT 102) in a second message 504. In some embodiments, the first message 502 and/or the second message 504 may comprise the C&M information, with the second OLT 110 accepting the C&M information from the BBU 101. Messages 502, 504 can correspond to the arrangement of the BBU 101 and the OLTs 102, 110 shown in FIGS. 2 and 4, for example. In an alternative embodiment, the second message 504 may be excluded, and the first OLT 102 sends the user data and/or C&M information to the second OLT 110 in a fourth message 508. In this alternative embodiment, messages 502, 508 can correspond to the arrangement of the BBU 101 and the OLTs 102, 110 shown in FIGS. 3 and 5, for example. In either embodiment, the first OLT 102 receives or accepts the user data, and sends the user data, but not the C&M information, to the first ONU 120 in a third message 506. At some point in time, the second OLT 110 sends the C&M information and optionally the user data to the second ONU 122 in fifth message 510. The fifth message 510 may be sent at any point in time after the C&M information has been received by the second OLT 110.

In an embodiment, the second ONU 122 sends any user data and/or the C&M information to the first ONU 120 in sixth message 512. The first ONU 120 sends the user data and/or the C&M information to the RRU 130 in seventh message 514. Messages 512, 514 can correspond to the arrangement of the ONUs 120, 122 and the RRU 130 shown in FIGS. 3 and 4, for example. In an alternative embodiment, the second ONU 122 sends the user data and/or the C&M information directly to the RRU 130 (e.g. bypassing the first ONU 120) in an eighth message 516. In this alternative embodiment, the eighth message 516 can correspond to the arrangement of the ONUs 120, 122 and the RRU 130 shown in FIGS. 2 and 5, for example.

At some point, the RRU 130 may send some user data to the first ONU 120 in ninth message 518. The first ONU 120 sends the user data to the first OLT 102 in tenth message 520. Additionally or alternatively, the first ONU 120 may send some of the user data and optionally some C&M information to the second ONU 122 in eleventh message 522. In this embodiment, messages 518, 522 can correspond to the arrangement of the RRU 130 and the ONUs 120, 122 shown in FIGS. 3 and 4, for example. Alternatively, the RRU 130 sends some user data directly to the second ONU 122 (e.g. bypassing the first ONU 120) in twelfth message 524. In this alternative embodiment, the twelfth message 524 can correspond to the arrangement of the RRU 130 and the ONUs 120, 122 shown in FIGS. 2 and 5, for example. In either embodiment, the second ONU 122 sends the C&M information and the user data to second OLT 110 in a thirteenth message 526. The thirteenth message 526 may be sent at any point in time after the C&M information has been received by the second ONU 122.

In one embodiment, the second OLT 110 sends the user data and at least some of the C&M information to the first OLT 102 in fourteenth message 528. The first OLT 102 then sends the user data to the BBU 110 in fifteenth message 530. In this embodiment, messages 528, 530 can correspond to the arrangement of the BBU 101 and the OLTs 102, 110 shown in FIGS. 3 and 5, for example. In an alternative embodiment, the second OLT 110 sends the user data directly to the BBU 101 (e.g. bypassing the first OLT 102) in sixteenth message 532. In this alternative embodiment, the sixteenth message 532 can correspond to the arrangement of the BBU 101 and the OLTs 102, 110 shown in FIGS. 2 and 4, for example.

It will be appreciated that the described system has many advantages. For example, using a second PON to carry C&M information for the first PON improves the bandwidth of the first PON. In addition, implementing the second PON using legacy (e.g. GPON or EPON) components allows the second PON to be added to the first PON at a relatively low cost. Moreover, the described architecture allows the various components (BBU, OLTs, ONUs, and RRUs) to be clock synchronized with each other. The clock synchronization remains even if the clocks on the components of the first PON are faster than the clocks on the components of the second PON. This is because the two OLTs use the same TQ (e.g., 0.64 ns). Such also improves the synchronization accuracy. Furthermore, the second PON reads multiple ToD measurements per day from the OLT memory, performs a moving average of the ToD measurements, and stores the moving average of the ToD measurements in the OLT memory, where the first OLT uses the moving average of the ToD measurements to adjust its clock. Doing so reduces the timing error due to uncertainties caused by clock inaccuracies and TimeStamp drift error, and hence further improves synchronization accuracy.

While the above text describes the various PONs in terms of mobile fronthaul, it will be appreciated that the described PONs are not limited to such. In an embodiment, the described PONs are used to pass user data between any two components (e.g. not just a BBU and an RRU). For example, the described PONs can be implemented in metro or access networks to distribute user data to residential or commercial subscribers. In such cases, using a second PON to carry C&M information for the first PON, which carries user data destined for an end user instead of the mobile devices, improves the bandwidth of the first PON.

According to a first aspect of the present disclosure, there is provided a system comprising means for receiving user data from a BBU, means for sending the user data to a RRU via a first ONU of the first PON using a first wavelength, and means for obtaining C&M information, means for sharing the C&M information with the first OLT, and means for sending the C&M information to a second ONU that is co-located with the first ONU using a second wavelength. In the above embodiment or in a separate embodiment, the C&M information is sent independent of sending the user data to the first ONU. In any of the above embodiments or in a separate embodiment, the system includes means for performing MAC processing before sending the C&M information. In any of the above embodiments or in a separate embodiment, the second ONU is configured to share the C&M information with the co-located first ONU. In any of the above embodiments or in a separate embodiment, the C&M information comprises at least one of ranging information, ToD information, registration information, or DBA information. In any of the above embodiments or in a separate embodiment, the system further comprises means for storing the C&M information in the OLT memory, wherein the first OLT and the second OLT both use the C&M information. In any of the above embodiments or in a separate embodiment, the first OLT and the second OLT use a same TQ. In any of the above embodiments or in a separate embodiment, the first OLT comprises a first clock having a first TQ, wherein the second OLT comprises a second clock having a second TQ, and wherein the second TQ is a positive integer multiple of the first TQ. In any of the above embodiments or in a separate embodiment, the system further comprises means for generating a moving average ToD from received ToD measurements, wherein the first OLT is configured to use the moving average ToD to adjust a clock of the first OLT. In any of the above embodiments or in a separate embodiment, the C&M information is sent by the second OLT at a second data transfer rate, wherein the user data is sent at a first data transfer rate that is faster than the second data transfer rate. In any of the above embodiments or in a separate embodiment, the first PON is part of an eCPRI, the second PON is a GPON or an EPON, and the eCPRI is a functional split between the BBU and the RRU.

According to a second aspect of the present disclosure, there is provided a system comprising means for transmitting downstream user data to a first ONU of the first PON at a first data transfer rate using a first wavelength, and means for transmitting downstream information to a second ONU that is collocated with the first ONU, wherein the downstream information is sent at a second data transfer rate that is lower than the first data transfer rate, and wherein the downstream information is sent using a second wavelength. In the above embodiment or in a separate embodiment, the downstream information sent at the second data transfer rate comprises C&M information. In the above embodiment or in a separate embodiment, the first OLT is configured to couple to a BBU. In any of the above embodiments or in a separate embodiment, the system further comprises means for communicating with the BBU, and means for transmitting a second downstream user data to a third ONU at the first data transfer rate using a third wavelength, wherein the system further includes means for obtaining C&M information from to the second OLT. In any of the above embodiments or in a separate embodiment, the system further includes means for reading multiple ToD measurements per day from the OLT memory, means for performing a moving average of the ToD measurements to generate a moving average ToD, and means for providing the moving average ToD to the first OLT, wherein the first OLT is further configured to use the moving average ToD to adjust a first OLT clock. In any of the above embodiments or in a separate embodiment, the system includes means for sending the C&M information to the second ONU independent of the means for sending the user data to the first ONU. In any of the above embodiments or in a separate embodiment, the system includes means for performing MAC processing before sending the C&M information to the second ONU. In any of the above embodiments or in a separate embodiment, one or more of the first ONU, the second OLT, the second ONU, the BBU, or the RRU are clock synchronized with the first OLT as a result of sharing the C&M information. In any of the above embodiments or in a separate embodiment, the second ONU shares the C&M information with the co-located first ONU. In any of the above embodiments or in a separate embodiment, the system further comprises an OLT memory coupled to the first OLT and the second OLT, wherein the C&M information is stored in the OLT memory, and wherein the first OLT and the second OLT both use the C&M information. In any of the above embodiments or in a separate embodiment, the first OLT and the second OLT use a same TQ. In any of the above embodiments or in a separate embodiment, the first OLT comprises a first clock having a first TQ, wherein the second OLT comprises a second clock having a second TQ, and wherein the second TQ is a positive integer multiple of the first TQ. In any of the above embodiments or in a separate embodiment, the system further comprises means for generating a moving average ToD from received ToD measurements, and means for using the moving average ToD to adjust a clock of the first OLT. In any of the above embodiments or in a separate embodiment, the first PON is part of an eCPRI, wherein the second PON is a GPON or an EPON, and wherein the eCPRI is a functional split between the BBU and the RRU.

According to a third aspect of the present disclosure, there is provided a system comprising means for sending upstream user data to a first OLT of the first PON at a first data transfer rate using a first wavelength, and means for sending C&M information to a second OLT of the second PON, the C&M information being for the first ONU and the second ONU, wherein the C&M information is sent at a second data transfer rate using a second wavelength, and wherein the user data is sent at a first data transfer rate that is faster than the second data transfer rate. In any of the above embodiments or in a separate embodiment, the first ONU comprises a first ONU receiver comprising an ADC and a first digital signal processor. In any of the above embodiments or in a separate embodiment, the first ONU comprises a first ONU transmitter, the second ONU comprises a second ONU transmitter, and the system further comprises a wavelength multiplexer coupled to the first ONU transmitter and the second ONU transmitter. In any of the above embodiments or in a separate embodiment, the first ONU comprises a first ONU receiver, the second ONU comprises a second ONU receiver, and the system further comprises a wavelength de-multiplexer coupled to the first ONU receiver and the second ONU receiver. In any of the above embodiments or in a separate embodiment, the upstream user data is transmitted in bursts that are cycled at a time interval that is less than or equal to 100 microseconds.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality. A single processor, a processor coupled to a memory storing instructions to be executed by the processor, or other unit may fulfill the functions of several items recited in the claims. The mere fact that certain measures are recited in mutually different dependent claims does not indicate, preclude or suggest that a combination of these measures cannot be used to advantage. A computer program may be stored or distributed on a suitable medium, such as an optical storage medium or a solid-state medium supplied together with, or as part of, other hardware, but may also be distributed in other forms, such as via the Internet or other wired or wireless telecommunication systems.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system comprising:
a first optical line terminal (OLT) of a first passive optical network (PON), the first OLT configured to:
receive user data from a baseband unit (BBU); and
send the user data to a remote radio unit (RRU) via a first optical network unit (ONU) of the first PON using a first wavelength; and
a second OLT of a second PON, the second OLT configured to:
obtain control and management (C&M) information;
share the C&M information with the first OLT; and
send the C&M information to a second ONU that is co-located with the first ONU using a second wavelength,
wherein the first PON and the second PON are part of an efficient common public radio interface (eCPRI).

2. The system of claim 1, wherein the second OLT is configured to send the C&M information to the second ONU independently of the first OLT sending the user data to the first ONU.

3. The system of claim 1, wherein the second OLT is configured to perform media access control (MAC) processing before sending the C&M information to the second ONU.

4. The system of claim 1, wherein the second ONU is configured to share the C&M information with the first ONU.

5. The system of claim 1, wherein the C&M information comprises at least one of: ranging information, time of day (ToD) information, registration information, or dynamic bandwidth allocation (DBA) information.

6. The system of claim 1, further comprising an OLT memory coupled to the first OLT and the second OLT, wherein the C&M information is stored in the OLT memory, and wherein the first OLT and the second OLT are both configured to use the C&M information.

7. The system of claim 1, wherein the first OLT and the second OLT are configured to use a same time quanta (TQ).

8. The system of claim 1, wherein the first OLT comprises a first cock having a first time quanta (TQ), wherein the second OLT comprises a second cock having a second TQ, and wherein the second TQ is a positive integer multiple of the first TQ.

9. The system of claim 1, wherein the second OLT is configured to generate a moving average time of day (ToD) from received ToD measurements and wherein the first OLT is configured to use the moving average ToD to adjust a clock of the first OLT.

10. The system of claim 1, wherein the C&M information is sent by the second OLT at a second data transfer rate, and wherein the user data is sent at a first data transfer rate that is faster than the second data transfer rate.

11. The system of claim 1, wherein the second PON is a gigabit PON (GPON) or an Ethernet PON (EPON), and wherein the eCPRI is a functional split between the BBU and the RRU.

12. The system of claim 1, wherein the first ONU is coupled to the RRU such that the first ONU is located between the first OLT and the RRU, and wherein the second ONU is coupled to the RRU such that the second ONU is located between the second OLT and the RRU.

13. A system comprising:
an optical line terminal (OLT) memory;
a first OLT of a first passive optical network (PON) coupled to the OLT memory and configured to transmit downstream user data to a first optical network unit (ONU) of the first PON at a first data transfer rate using a first wavelength, the first ONU being coupled to an ONU memory; and
a second OLT of a second PON coupled to the OLT memory and configured to transmit downstream information to a second ONU that is co-located with the first ONU, the second ONU also being coupled to the ONU memory, the downstream information being sent at a second data transfer rate that is lower than the first data transfer rate, and the downstream information being sent using a second wavdelength.

14. The system of claim 13, wherein the downstream information sent at the second data transfer rate comprises control and management (C&M) information.

15. The system of claim 14, wherein the first OLT is configured to couple to a bmseband unit (BBU).

16. The system of claim 15, wherein the system further comprises a third OLT coupled to the OLT memory and configured to:
communicate with the BBU; and
transmit a second downstream user data to a third ONU at the first data transfer rate using a third wavelength, and
wherein the third OLT is further configured to obtain C&M information from the second OLT.

17. The system of claim 14, wherein the second OLT sends the C&M information to the second ONU independently of the first OLT sending the downstream user data to the first ONU.

18. The system of claim 14, wherein the second OLT performs media access control (MAC) processing before sending the C&M information to the second ONU.

19. The system of claim 14, wherein one or more of the first ONU, the second OLT, or the second ONU are clock synchronized with the first OLT as a result of sharing the C&M information.

20. The system of claim 14, wherein the second ONU shares the CAM information with the first ONU.

21. The system of claim 14, further comprising an OLT memory coupled to the first OLT and the second OLT, wherein the C&M information is stored in the OLT memory, and wherein the first OLT and the second OLT both use the C&M information.

22. The system of claim 13, wherein the second OLT is further configured to:
read multiple time of day (ToD) measurements per day from the OLT memory;
perform a moving average of the ToD measurements to generate a moving average ToD; and
provide the moving average ToD to the first OLT, and wherein the first OLT is further configured to use the moving average ToD to adjust a first OLT clock.

23. The system of claim 13, wherein the first OLT and the second OLT use a same time quanta (TQ).

24. The system of claim 13, wherein the first OLT comprises a first clock having a first time quanta (TQ), wherein the second OLT comprises a second clock having a second TQ, and wherein the second TQ is a positive integer multiple of the first TQ.

25. The system of claim 13, further comprising the second PON generating a moving avrage time of day (ToD) from received ToD measuments and wherein the first OLT uses the moving average ToD to adjust a clock of the first OLT.

26. The system of claim 13, wherein the first PON is part of an efficient common public radio interface (eCPRI), and wherein the second PON is a gigabit PON (GPON) or an Ethernet PON (EPON).

27. The system of claim 13, wherein the first ONU is coupled to a remote radio unit (RRU) such that the first ONU is located between the first OLT and the RRU, and wherein the second ONU is coupled to the RRU such that the second ONU is located between the second OLT and the RRU.

28. A system comprising:
a first optical network unit (ONU) of a first passive optical network (PON) coupled to a remote radio unit (RRU) and configured to send upstream user data to a first optical line terminal (OLT) of the first PON at a first data transfer rate using a first wavelength; and
a second ONU of a second PON coupled to the RRU and configured to send control and management (C&M) information to a second OLT of the second PON, the C&M information being for the first ONU and the second ONU, the C&M information ng sent at a second data transfer rate using a second wavelength, and the first data transfer rate being faster than the second data transfer rate.

29. The system of claim 28, wherein the first ONU comprises a first ONU receiver comprising an analog to digital converter (ADC) and a first digital signal processor.

30. The system of claim 28, wherein the first ONU comprises a first ONU transmitter, wherein the second ONU comprises a second ONU transmitter, and wherein the system further comprises a wavelength multiplexer coupled to the first ONU transmitter and the second ONU transmitter.

31. The system of claim 28, wherein the first ONU comprises a first ONU receiver, wherein the second ONU comprises a second ONU receiver, and wherein the system further comprises a wavelength de-multiplexer coupled to the first ONU receiver and the second ONU receiver.

32. The system of claim 28, wherein the upstream usr data is transmitted in bursts that are cycled at a time interval that is less than or equal to 100 microseconds.

33. The system of claim 28, further comprising an ONU memory coupled to the first ONU and the second ONU, wherein the first ONU is located between the first OLT and the RRU, and wherein the second ONU is located between the second OLT and the RRU.

* * * * *

UNITED STATES PATENT AND TRADEMARK OFFICE
CERTIFICATE OF CORRECTION

PATENT NO. : 10,623,129 B2
APPLICATION NO. : 15/706460
DATED : April 14, 2020
INVENTOR(S) : Frank Effenberger et al.

Page 1 of 1

It is certified that error appears in the above-identified patent and that said Letters Patent is hereby corrected as shown below:

In the Claims

Column 19, Line 40 Claim 8, should read:
8. The system of claim 1, wherein the first OLT comprises a first clock having a first time quanta (TQ), wherein the second OLT comprises a second clock having a second TQ, and wherein the second TQ is a positive.

Column 20, Line 60 Claim 25, should read:
25. The system of claim 13, further comprising the second PON generating a moving average time of day (ToD) from received ToD measurements, and wherein the first OLT uses the moving average ToD to adjust a clock of the first OLT.

Column 21, Line 6 Claim 28, should read:
28. A system comprising:
    a first optical network unit (ONU) of a first passive optical network (PON) coupled to a remote radio unit (RRU) and configured to send upstream user data to a first optical line terminal (OLT) of the first PON at a first data transfer rate using a first wavelength; and
    a second ONU of a second PON coupled to the RRU and configured to send control and management (C&M) information to a second OLT of the second PON, the C&M information being for the first ONU and the second ONU, the C&M information being sent at a second data transfer rate using a second wavelength, and the first data transfer rate being faster than the second data transfer rate.

Signed and Sealed this
Second Day of June, 2020

Andrei Iancu
*Director of the United States Patent and Trademark Office*